Sept. 25, 1934. O. V. STEWART ET AL Re. 19,328

DUAL ANODE

Original Filed Aug. 13, 1927

WITNESSES:
E. C. Leiding.
Wm. C. Groome

INVENTORS.
Otho V. Stewart and
Emil Urban.
BY J. Howard Flint.
ATTORNEY

Reissued Sept. 25, 1934 Re. 19,328

UNITED STATES PATENT OFFICE 19,328

DUAL ANODE

Otho V. Stewart and Emil Urban, Forest Hills, Pa., assignors to Westinghouse Electric and Manufacturing Company, a corporation of Pennsylvania Original No. 1,765,706, dated June 24, 1930, Serial No. 212,652, August 13, 1927. Application for reissue March 5, 1932, Serial No. 597,044

19 Claims. (Cl. 204—4)

Our invention relates to the process of electroplating and has particular reference to a dual or two-element anode in which one or both of the elements may be readily replaced.

Heretofore it was known that when a soluble anode was used that the metal of the anode would operate to replenish the electro-plating material in the bath but that rapid dissolution of the anode sometimes resulted in polarization, thus eventually slowing down or preventing the replenishment of the bath. It was found when the anode was made of two metals, one an active metal which was being consumed in the electro-plating process and the other an inactive metal such as carbon, iron or steel which was not consumed, that polarization of the active element was practically eliminated.

It was found that a certain ratio between the active and inactive elements was desirable but the structures utilized were found to possess several mechanical difficulties. One difficulty was that the active material was consumed while the inactive material was not, and that, as the result thereof the ratio of exposed area of inactive anode surface to the exposed area of active anode surface was changed materially during the process and partially consumed anodes had to be replaced with new ones in order to preserve the ratio. The active material was fastened to the inactive material by mechanical devices and corrosion of the devices made removal of the active material difficult. Thus the operation of changing the active material of the anode involved a considerable loss of time and destruction of the insoluble anode. Therefore, it is one of the objects of our invention to provide an anode for electroplating in which the plating metal may be readily replenished as it is consumed.

Another object of our invention is to provide a two element anode in which the desired ratio between active and inactive material may be continuously maintained as the active material is consumed.

Another object of our invention is to provide a dual anode in which the active element may be entirely consumed after having been once placed in the plating bath.

A still further object of our invention is to provide an anode which, by reason of its construction, readily lends itself to a computation of the weight of plating metal consumed over any given period of time.

Our invention may be more readily understood by reference to the accompanying drawing in which like figures indicate like parts.

Figure 1:
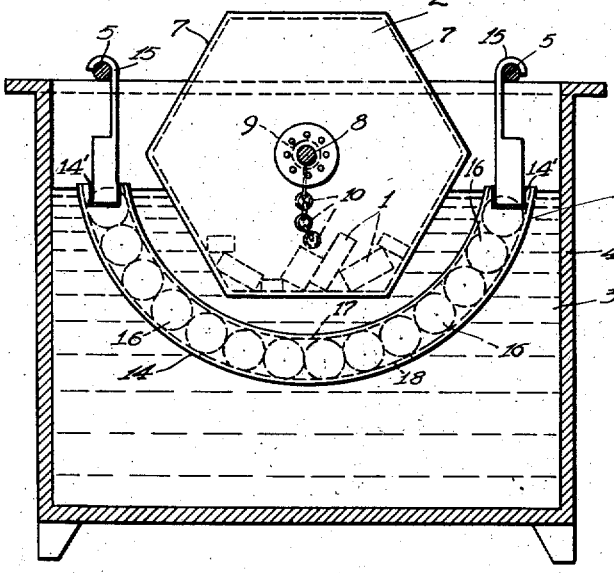
Figure 1 is a sectional end view of an electroplating bath having our anode mounted therein.

Referring more particularly to Fig. 1, in which a device for cadmium plating is shown, the material 1 to be plated is placed in a plating drum 2 and the plating drum is partially submerged in the plating bath 3 in the containen 4. Copper rods 5 longitudinally disposed with relation to the container provide a support for the anode 6 and are connected to the positive side of a power line. The sides 7 of the plating drum may be constructed of a non-metallic material such as wood. Electrical connection to the negative side of a power line may be made through the axle 8 of the plating drum. The ring 9 engages the axle and carries other rings 10 which are allowed to come into contact with the material to be plated, thus forming the cathode.

The plating drum may be a six-sided barrel-shaped member and may be slowly rotated so that the material to be plated will be tumbled and all sides of the material will receive a uniform coating.

The anode 6 is a tubular member 14 provided with a suspending hook portion 15 at each end which may be secured to the tubular member by any suitable means, such as a weld, as indicated at 14′ in the drawing. The cadmium or active element is preferably in the form of rods or balls 16 of such dimensions that they can be readily inserted in the tubular portion 14 of the anode. A slot 17 is provided in the tubular member in order to permit the circulation of the electrolyte around the active anode material. The ratio of active to inactive material may be controlled by varying the size of the slot. If desired, a plurality of openings such as those shown in Fig. 4 may be substituted for the slot 17.

As impurities are present in the cadmium and other impurities collect in the bottom portion of the anode, a discharge slot 18 is provided in the under side of the anode in order that these impurities may be dislodged and discharged.

As the cadmium is consumed, the balls in the upper portion of the anode drop downwardly, thus leaving space for inserting new active material. In practice, the proportions of active material, as represented by cadmium balls, and the inactive material, as represented by the tubular container may be conveniently proportioned so that the correct ratio of active to inactive material will exist when active metal projects above the surface of the electrolyte. When the balls disappear below the surface of the plating bath, new balls may be added in order to maintain the proportion of the active and inactive materials. All the cadmium is eventually entirely consumed, so that when new balls are added, their weight may be recorded and in this manner the amount of cadmium used during certain predetermined periods may be readily computed.

Figure 4:
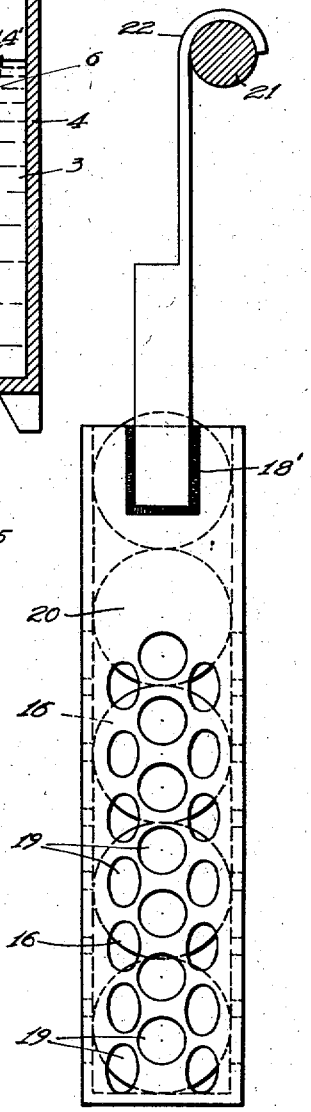
Fig. 4 is a modified form of our anode adapted to be suspended vertically from a bus bar.
Figure 2:
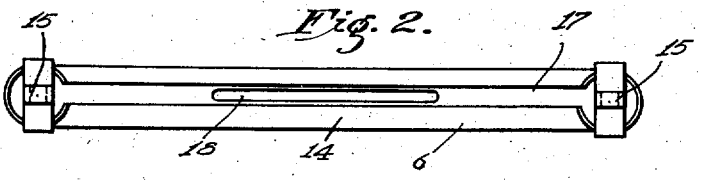
Fig. 2 is a top view of the anode.
Figure 3:
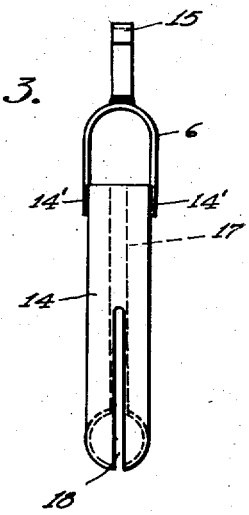
Fig. 3 is an end view of the anode shown in Fig. 2.

In some electro-plating processes, it is not possible to utilize an anode such as has been described because of the lack of available space beneath the plating drum and therefore, a modified arrangement of our anode such as that shown in Fig. 4 may be utilized. In this modification, the inactive element of the anode is comprised of a tubular member 20 closed at the bottom and provided with a number of openings 19 at its side. The tubular member is suspended from the positive bus bar 21 by means of a hook 22 which is secured to the tubular member 20 by any suitable means, such as a weld, as indicated at 18'. The cadmium balls 16 are placed inside of the container, as before, and the consumption of cadmium progresses during the electrolysis. The solution may pass into the container through the openings in the side thereof and dissolve the cadmium. The ratio of active to inactive material may be controlled by varying the size and number of the openings. A plating metal, such as cadmium, may be readily replenished without loss of time as it is consumed. The entire active element is consumed without removing it from the electro-plating bath and the amount of plating material consumed during a predetermined period may be readily computed.

From this description and the accompanying drawing, it is apparent that this invention provides a composite anode for electro-plating, having in combination a housing of elongate structure variable to control the ratio of active anode surface by wall openings permitting free flow of electrolyte and of material that is insoluble in the electrolyte, such as ferrous metal for example, containing a consumable, self-descending anode of relatively soluble plating metal, such as cadmium for example, in the form of a single column of approximately spheroidal units, to maintain substantially constant surface conditions of the anode during electro-plating.

Although we have described a specific modification of a device embodying our invention with reference to the electrode position of cadmium, we do not wish to be limited thereto, as the device may be utilized in various electro-plating processes such as nickel plating and chromium plating. Modifications in the form of the tubular anode and other modifications may be made without departing from the spirit and scope of our invention, as defined in the appended claims.

We claim as our invention:

1. An anode comprising a tubular recessed body of inactive material for supporting a plurality of bodies of active material and provided with an opening at each end, the axis of said body being semi-annular in form, and means on said body for establishing an electrical contact.

2. An anode comprising a recessed body of inactive anode material for supporting a plurality of bodies of active material, said recessed body being semi-annular and tubular, and means on each end thereof for supporting said body.

3. An anode comprising a recessed body of inactive anode material for supporting a plurality of bodies of active material, said recessed body being semi-annular and tubular and means on each end for supporting said body, said body being slotted to permit contact of the electrolyte with the active material.

4. An anode comprising active and inactive material said inactive material including a tubular recessed body for supporting a plurality of bodies of active material, said recessed body having a slot in its normally upper portion to permit contact of the electrolyte with said active material and another slot in its normally lower portion to permit the discharge of impurities, and supporting means at each end of said tubular body.

5. An anode comprising active and inactive material, said inactive material including a recessed body for supporting a plurality of bodies of the active material, said recessed body being in the form of a semi-annular tube having a plurality of openings to permit contact of the electrolyte with the active material, and supporting means at each end of said tubular body.

6. An anode comprising active and inactive material, said inactive material including a tubular recessed body, said recessed body having an opening for inserting active material and another opening for providing contact of electrolyte with the active material and a hook on said inactive material for supporting the same.

7. An anode comprising a recessed tubular member of inactive material for supporting a plurality of bodies of active material, said tubular member being provided with an opening at each end for inserting the active material and with an elongated slot for permitting an electrolyte to uniformly come in contact with all portions of the active material.

8. An anode comprising a recessed tubular member of inactive material for supporting a plurality of bodies of active material, said tubular member being provided with an opening at each end for insertion of the active material and with a slot extending throughout its length to permit an electrolyte to uniformly come in contact with all portions of the active material.

9. An anode comprising a curved integral tubular recessed body of inactive material for supporting a plurality of bodies of active material, said tubular body being provided with an opening at each end for the insertion of active material and with an elongated slot to ensure a uniform ratio between the exposed area of the active and that of the inactive material, and means for supporting said anode.

10. A two-element anode comprising a curved tubular recessed body of inactive material and a plurality of bodies of active material supported thereby, said tubular body being provided with a longitudinal slot in its normally upper portion to provide a definite ratio between the exposed area of the active and that of the inactive material, an opening at each end for insertion of additional active material so that the ratio may be maintained substantially constant, and another slot in its normally lower portion to permit the discharge of impurities.

11. A two-element anode comprising a curved tubular recessed body of inactive material and a plurality of bodies of active material supported thereby said tubular body being provided with a longitudinal slot in its normally upper portion to provide a definite ratio between the exposed area of the active and that of the inactive material and an opening at each end for insertion of additional active material, and means for supporting said anode.

12. A composite anode for electro-deposition, comprising in combination a housing of elongate, open-wall structure permitting free flow of electrolyte therethrough and relatively insoluble in the electrolyte, containing a consumable anode or relatively soluble plating metal in the form of a single column of approximately spheroidal units, to maintain substantially constant surface conditions of the anode during electro-plating.

13. A composite anode for electro-deposition, comprising in combination an electrically conducting housing of elongate, open-wall structure permitting free flow of electrolyte therethrough and relatively soluble in the electrolyte, containing a consumable anode of relatively soluble plating metal in the form of a single column of approximately spheroidal units, to maintain substantially constant surface conditions of the anode during electro-plating.

14. A composite anode for electro-deposition, comprising in combination a housing of elongate, open-wall structure permitting free flow of electrolyte therethrough and relatively insoluble in the electrolyte, containing a consumable anode of cadmium as relatively soluble plating metal in the form of a single column of approximately spheroidal units to maintain substantially constant surface conditions of the anode during electro-plating.

15. A composite anode for electro-deposition, comprising in combination a housing containing ferrous metal exposed to the electrolyte and having an elongate open-wall structure permitting free flow of electrolyte therethrough, containing a consumable anode surface of cadmium as relatively soluble plating metal in the form of a single column of approximately spheroidal units, to maintain substantially constant surface conditions of the anode during electro-plating, said units being in electrical contact with the ferrous metal.

16. A composite anode for use in electro-deposition, comprising a relatively long and narrow hollow cage of foraminous material, relatively insoluble in the electrolyte and conductive of electric current, and a plurality of self-descending soluble anode balls of metal to be deposited, said self-descending balls being relatively large so as substantially to fill the cross-section of the cage, and said cage being replenishable with anode balls on solution of the metal to be deposited.

17. A soluble electro-plating anode comprising metal consumable in an electro-plating bath and arranged in the form of a single column of approximately spheroidal units for advancement in the column as the metal is consumed.

18. A consumable electro-plating anode comprising an elongate carrier relatively insoluble in an electro-plating bath with relatively soluble metal for electro-deposition, supported by the carrier, in the form of a plurality of approximately spheroidal units arranged for advancement as the metal is consumed, the units in at least the more extensive portion of soluble metal surface being aligned in a single column.

19. A consumable electro-plating anode comprising a columnar, open-wall housing relatively insoluble in an electro-plating bath with metal for electro-deposition in the form of a plurality of substantially spheroidal units arranged for self-descent in the housing and substantially filling at least the upper portion of the housing in a single column.

OTHO V. STEWART.
EMIL URBAN.